July 3, 1951  R. WALSH  2,559,483

METHOD OF WELDING TOGETHER METALLIC MEMBERS

Filed July 24, 1948

INVENTOR.
ROBERT WALSH
BY George R. Ericson
ATTORNEY

Patented July 3, 1951

2,559,483

UNITED STATES PATENT OFFICE 2,559,483

METHOD OF WELDING TOGETHER METALLIC MEMBERS

Robert Walsh, Wilmington, Del., assignor to American Car and Foundry Company, New York, N. Y., a corporation of New Jersey Application July 24, 1948, Serial No. 40,538

7 Claims. (Cl. 219—10)

This invention relates to electric welding and particularly to an improved method of spot welding together metallic members of unequal thicknesses or of relatively great equal thickness.

In the spot welding together of two relatively thin members or plates, only a comparatively small welding current is required due to the slight thickness of the plates through which the current must pass. There is thus a relatively small amount of heat generated by the current which is insufficient to materially expand the metal of the plates and, therefore, no warping or buckling of the plates will result during the cooling process after completion of the welding operation. However, when two relatively thick members or plates, or a relatively thick plate and a relatively thin plate, are spot welded together, a stronger welding current is required due to the greater thickness of the metal, with the consequent increase in the generation of heat. This heat causes considerable expansion of the metal which, during the cooling process, shrinks or contracts unevenly and results in the undesirable condition of buckling or distortion.

Further, in spot welding together two plates of unequal thicknesses, it is well known that the thinner plate becomes heated through more rapidly than the thicker plate. This is due largely to the fact that the welding electrodes are applied to the exposed surfaces of the two plates, and since the thicker plate offers greater resistance to the passage of current than does the thinner plate, the thinner plate may be burned before the thicker plate is brought to welding temperature, since it requires a longer time to sufficiently heat the thicker plate. Similarly, in the welding together of two plates of relatively great thickness, a considerable interval of time must be allowed for sufficient heating of the two plates because of the time required for passage of the welding current through them. In practice, since passing continuous current through the electrodes would result in over-heating and consequent reduction of electrode life, it is customary to use a number of spaced current impulses, for example, two cycles on and two cycles off, the electrodes being permitted to cool during the two cycles off to avoid over-heating of the electrodes. This is obviously a time consuming method, particularly where a great number of welds must be made.

It is an object of this invention to provide an improved method of spot welding together members of relatively great thickness without the usual resulting development of buckling and distortion of the members after completion of the welding operation.

Another object of this invention is to provide an improved method of spot welding together members of unequal thicknesses without burning of the thinner member and without causing the usual distortion or warping of the plates during the cooling process.

A further object of the invention is to provide an improved method whereby the time required for sufficiently heating two relatively thick members for spot welding together is materially shortened, thereby reducing the number of required spaced current impulses to avoid overheating of the electrodes.

These and other objects of the invention will be apparent to those skilled in the art from a study of the following description and accompanying drawings in which.

Figure 1:
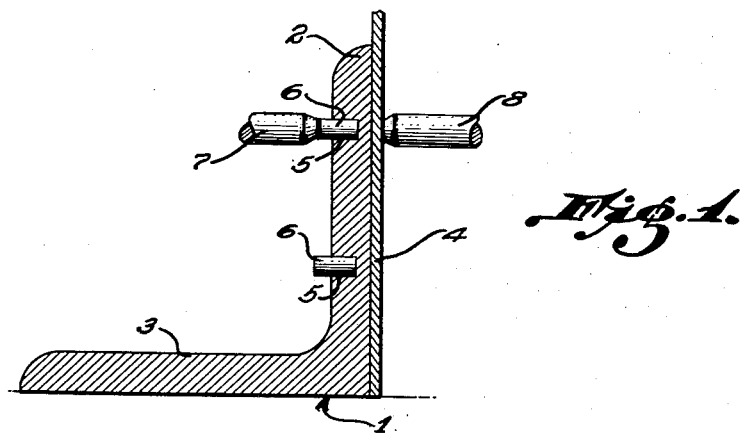
Figure 1 is a sectional view through a structural member and a plate in position with the electrodes applied for spot welding together in accordance with the method of this invention.

Referring now more in detail to the drawings, Figure 1 shows an angle member 1 having legs 2 and 3. A metal plate 4 of relatively thinner section than the legs 2 and 3 of angle members 1 is shown in position to be spot welded to the leg 2. In preparation for the spot welding operation, holes 5 have been drilled in the exposed surface of leg 2 extending normal to the surface to be welded at those points where it is desired to make the welds. The holes 5 are of such depth that the undrilled portion of the thickness of leg 2 between the bottom of the holes and the opposite face of the leg is substantially equal to thickness of metal plate 4. Cylindrical plugs, of copper or other metal having low electrical resistance, and of approximately the same diameter as holes 5, are driven into the holes. Welding electrodes 7 and 8 are applied under pressure simultaneously to the exposed end of one of the copper plugs 6 and the point on plate 4 opposite to the copper plug and a current impulse is passed through them. Because of the low resistance of copper plug 6 it functions substantially as an extension of electrode 7 so that the actual thickness of the leg 2 of angle member 1 that must be heated is only the undrilled portion thereof between the inner end of the plug and the surface of the leg 2 which is to be welded. As described previously, this undrilled portion of leg 2 is made equal in thickness to the thickness of plate 4. Consequently, the time and amount of current required to sufficiently heat each of the surfaces of leg 2 and plate 4 which are to be welded together will be the same. Therefore, burning of the relatively thin plate 4 before the thicker leg 2 reaches welding temperature will be avoided. Further, since it requires much less welding current to pass through the reduced thickness of leg 2 than through its full thickness, less heat is generated during the welding operation. Thus there will be comparatively little expansion and contraction of the metal during heating and cooling, eliminating the condition which causes buckling and distortion. After the welding operation has been completed, the copper plugs 6 may be left in leg 2 of the angle member 1, or they may be removed, as desired.

Figure 2:
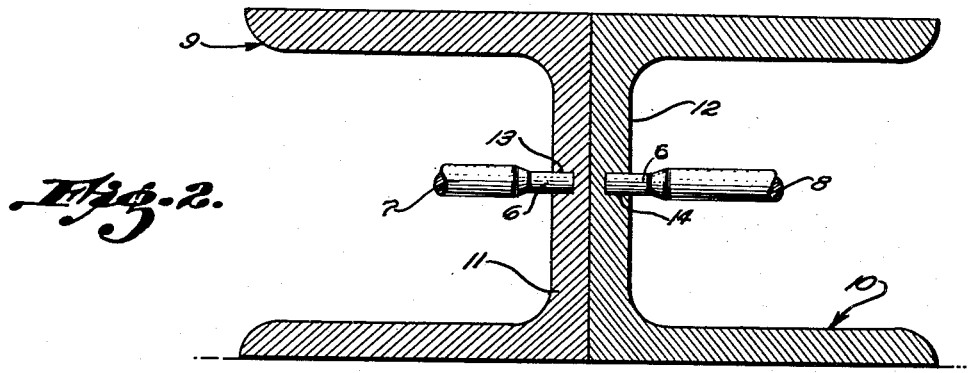
Figure 2 is a similar view showing two structural members in position for spot welding together according to the method of the invention.

Referring now to Figure 2, two channel members 9 and 10 having webs 11 and 12, respectively, of approximately equal thickness, are shown in position to be spot welded together. In accordance with the method of this invention, holes 13 and 14 are drilled from the exposed surfaces of webs 11 and 12, respectively. The depth of the holes is governed by the current used and the type of metal of which the channel members are made. The depth of holes 13 and 14 is such that the effective thickness of webs 11 and 12 remaining between the bottoms of the holes is sufficiently small as to require only one current impulse to heat the surfaces to be welded to fusion temperature. After the holes have been drilled, and plugs 6 inserted, electrodes 7 and 8 are applied under pressure to the exposed ends of the plugs, and a current impulse passed through them. Since copper plugs 6 offer little resistance to the passage of the current, the current will pass through them more rapidly than through a similar thickness of steel or similar metals, so that the time required to heat the surfaces to be welded to fusion temperature will be materially shortened. As a result of this material shortening of the time required, it will not be necessary to use a plurality of spaced current impulses in order to avoid over-heating of electrodes 7 and 8. Also, for the reason previously given with reference to Figure 1, there will be relatively little heat generated during the welding operation. Expansion and contraction of the metal during heating and cooling will therefore be reduced to a minimum, resulting in elimination of the condition which causes buckling and warping.

The invention may be modified in various respects as will occur to those skilled in the art and the exclusive use of all modifications as come within the scope of the appended claims is contemplated.

What is claimed is:

1. The method of preparing and spot welding together two metallic members of which at least one member is of a thickness requiring the passage therethrough of more than minimum electric current required to form a nugget at the adjacent surfaces of the members to be welded, reducing the thickness of said member by forming a depression therein such that the zone to be welded to the other member is of a thickness requiring the passage therethrough of minimum electric current to form the weld, inserting metal having a lower electrical resistance than said members into the depression, holding the members together with the depression in the one member opening away from the other member, and passing current through the members by electrodes applied to the inserted metal in the one member and to the other member, the minimum current requirement resulting from the depression and the lower resistance metal in said depression generating a minimum heat of the metal in the zone adjacent the nugget thereby holding distortion to a minimum.

2. The method of welding two metallic members together comprising drilling the members in a direction toward the surfaces where they are to be welded together to leave equal thicknesses of metal in each member beyond the drilled portions thereof, inserting plugs of metal having lower electrical resistance than said members into the drilled portions thereof, applying electrodes to said plugs with the members positioned in abutting relation for welding and the drilled portions thereof in spaced axial alignment with each other, and supplying electric current to said electrodes.

3. The method of welding together two metal members of different thicknesses which comprises drilling the thicker member in a direction toward the point where it is to be welded to the thinner member so that its thickness beyond the drilled portions thereof is equal to the thickness of the thinner member, inserting plugs of metal having lower electrical resistance than said members into said drilled portions, applying electrodes to the exposed ends of the plugs and to the remote surface of the thinner member at points in spaced axial alignment with said plugs with the members positioned in abutting relation for welding, and supplying electric current to said electrodes.

4. The method of welding together two metal members of the same thickness which comprises drilling each of said members in a direction toward the surfaces where they are to be welded together so that the remaining thicknesses of metal in the members beyond the drilled portions are equal, inserting plugs of metal having lower electrical resistance than said members into said drilled portions, applying electrodes to the tips of said plugs with the members positioned in abutting relation for welding and the drilled portions thereof in spaced axial alignment with each other, and supplying electric current to said electrodes.

5. The method of welding together two metal members of unequal thicknesses which comprises drilling the thicker of said members in a direction toward the points where it is to be welded to the thinner member to a depth such that its remaining thickness beyond the drilled portions thereof is equal to the thickness of the thinner of said members, driving plugs of metal having lower electrical resistance than said members into the drilled portions of said thicker member, applying electrodes to the exposed tips of said plugs and to the remote surface of said thinner member at points in spaced axial alignment with said plugs with the members positioned in abutting relation for welding, and supplying electric current to said electrodes until said members become fused together.

6. The method of welding together two metallic members of equal thickness which comprises drilling holes of equal depth in each of said members in a direction toward the surfaces where they are to be welded to leave equal thicknesses of metal therein beyond the bottom of the holes, driving plugs of metal having lower electrical resistance than said members into said holes, applying electrodes to the exposed tips of said plugs with the members positioned in contacting relation for welding and the plugs in spaced axial alignment with each other, and supplying electric current to said electrodes, said plugs serving as an extension of said electrodes whereby to reduce the thickness of said members through which the current is required to pass.

7. The method of welding together two metallic members of unequal thicknesses comprising drilling a hole of such depth in the thicker member in a direction toward the point where it is to be welded to the thinner member so that its thickness beyond the bottom of the hole is equal to the thickness of the thinner member, driving a plug of metal having lower electrical resistance than said members into said hole, applying electrodes to the exposed tip of said plug and to the remote surface of the thinner member at a point in spaced axial alignment with said plug with the members in position to be welded together, and supplying electric current to said electrodes, said plug acting as an extension of one of the electrodes whereby to equalize the distance that said current travels through each of said members.

ROBERT WALSH.

REFERENCES CITED

The following references are of record in the file of this patent:

UNITED STATES PATENTS

| Number | Name | Date |
|---|---|---|
| 555,131 | Thomson | Feb. 25, 1896 |
| 963,218 | Gilmore | July 5, 1910 |
| 2,012,305 | Farr | Aug. 27, 1935 |
| 2,327,924 | Mounts | Aug. 24, 1943 |
| 2,432,631 | Rosendale | Dec. 16, 1947 |

FOREIGN PATENTS

| Number | Country | Date |
|---|---|---|
| 363,486 | Great Britain | Dec. 24, 1931 |